(12) United States Patent
Deng et al.

(10) Patent No.: US 12,088,190 B2
(45) Date of Patent: Sep. 10, 2024

(54) ZERO-VOLTAGE-SWITCHING CONTROL CIRCUIT, CONTROL METHOD AND SWITCHING POWER SUPPLY

(71) Applicant: Silergy Semiconductor Technology (Hangzhou) LTD, Hangzhou (CN)

(72) Inventors: Jian Deng, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 18/131,992

(22) Filed: Apr. 7, 2023

(65) Prior Publication Data

US 2023/0246538 A1 Aug. 3, 2023

Related U.S. Application Data

(63) Continuation of application No. 17/085,046, filed on Oct. 30, 2020, now Pat. No. 11,664,720.

(30) Foreign Application Priority Data

Nov. 8, 2019 (CN) .......................... 201911089104.3

(51) Int. Cl.
*H02M 3/335* (2006.01)
*H02M 1/08* (2006.01)
*H02M 1/00* (2006.01)

(52) U.S. Cl.
CPC ....... *H02M 1/083* (2013.01); *H02M 3/33592* (2013.01); *H02M 1/0058* (2021.05); *H02M 3/33515* (2013.01); *H02M 3/33523* (2013.01); *H02M 3/33576* (2013.01)

(58) Field of Classification Search
CPC ......... H02M 3/33515; H02M 3/33523; H02M 3/33576; H02M 3/33592
See application file for complete search history.

(56) References Cited

U.S. PATENT DOCUMENTS

| | | | |
|---|---|---|---|
| 6,005,780 A | 12/1999 | Hua | |
| 6,580,258 B2 | 6/2003 | Wilcox et al. | |
| 8,964,421 B2 | 2/2015 | Kong et al. | |
| 9,325,254 B2 | 4/2016 | Deng et al. | |
| 9,331,588 B2 | 5/2016 | Chen | |
| 9,479,067 B2 * | 10/2016 | Gong | H02M 3/33515 |
| 9,488,680 B2 | 11/2016 | Xu | |
| 9,525,357 B2 | 12/2016 | Chen | |
| 9,893,639 B1 * | 2/2018 | Chen | H02M 3/33592 |
| 9,899,931 B1 * | 2/2018 | Chang | H02M 3/33592 |
| 10,063,131 B2 | 8/2018 | Yang et al. | |
| 2014/0003096 A1 * | 1/2014 | Deng | H02M 3/33592 363/21.14 |

(Continued)

*Primary Examiner* — Gary A Nash

(57) ABSTRACT

A zero-voltage-switching control circuit for a switching power supply having a main power switch and a synchronous rectifier switch, is configured to: control the synchronous rectifier switch to be turned on for a first time period before the main power switch is turned on and after a current flowing through the synchronous rectifier switch is decreased to zero according to a switching operation of the main power switch in a previous switching period of the main power switch; and where a drain-source voltage of the main power switch is decreased when the main power switch is turned on, in order to reduce conduction loss.

22 Claims, 6 Drawing Sheets

(56) References Cited

U.S. PATENT DOCUMENTS

| | | | |
|---|---|---|---|
| 2014/0078788 A1* | 3/2014 | Yao | H02M 3/33592 |
| | | | 363/21.14 |
| 2014/0078789 A1 | 3/2014 | Li et al. | |
| 2014/0239934 A1 | 8/2014 | Zhang | |
| 2015/0023062 A1 | 1/2015 | Hyugaji et al. | |
| 2015/0124494 A1* | 5/2015 | Malinin | H02M 3/33592 |
| | | | 363/21.14 |
| 2015/0124495 A1* | 5/2015 | Kong | H02M 3/33592 |
| | | | 363/21.14 |
| 2015/0160270 A1 | 6/2015 | Shi et al. | |
| 2015/0280578 A1 | 10/2015 | Huang et al. | |
| 2017/0353099 A1* | 12/2017 | Yang | H02M 1/08 |

* cited by examiner

ZERO-VOLTAGE-SWITCHING CONTROL CIRCUIT, CONTROL METHOD AND SWITCHING POWER SUPPLY

RELATED APPLICATIONS

This application is a continuation of the following application, U.S. patent application Ser. No. 17/085,046, filed on Oct. 30, 2020, and which is hereby incorporated by reference as if it is set forth in full in this specification, and which also claims the benefit of Chinese Patent Application No. 201911089104.3, filed on Nov. 8, 2019, which is incorporated herein by reference in its entirety..

FIELD OF THE INVENTION

The present invention generally relates to the field of power electronics, and more particularly to zero-voltage-switching control circuits, and associated control methods and switching power supplies.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Flyback converter are typically very suitable for low-power switching power supplies due to the relatively simple design and wide range of input and output voltage. However, under the continuous conduction mode (CCM), quasi-resonant (QR) mode, or discontinuous conduction mode (DCM), turn-on losses may occur, which can greatly limit improvements in switching frequency, reduction of volume, and efficiency. In order to solve these problems, one approach is to use another switch to reverse a certain output voltage to the excitation inductor, in order to realize zero-voltage-switching of the primary MOS transistor, thereby improving the system performance. In one approach, synchronous rectifier switches are shared, but this may only be applied in the QR mode, and not in DCM, so the applications thereof are limited. Another approach is to supply one output voltage by a control circuit, which requires an additional switch, thereby increasing system complexity. In addition, these schemes may not be extended to other topologies, further limiting possible applications.

In one embodiment, a zero-voltage-switching control circuit for a switching power supply having a main power switch and a synchronous rectifier switch, is configured to: (i) control the synchronous rectifier switch to be turned on for a first time period before the main power switch is turned on and after a current flowing through the synchronous rectifier switch is decreased to zero according to a switching operation of the main power switch in a previous switching period of the main power switch; and (ii) where a drain-source voltage of the main power switch is decreased when the main power switch is turned on, in order to reduce conduction loss.

Figure 1:
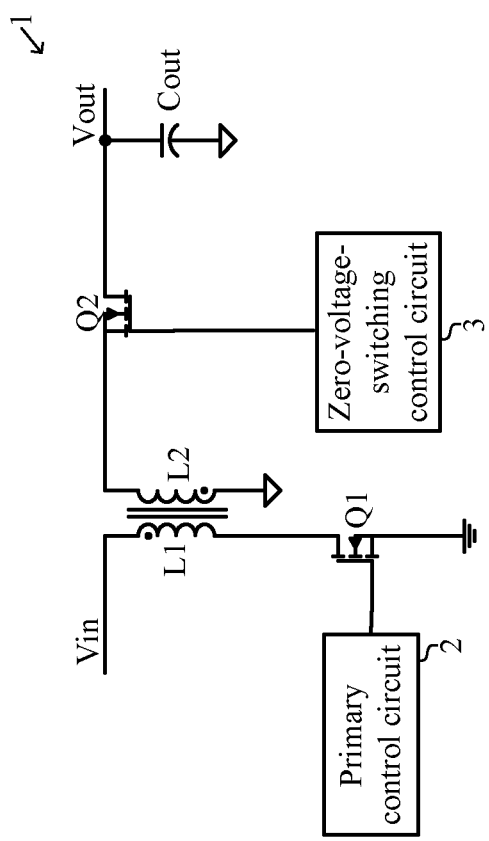
FIG. 1 is a schematic block diagram of an example switching power supply, in accordance with embodiments of the present invention.

Referring now to FIG. 1, shown is a schematic block diagram of an example switching power supply, in accordance with embodiments of the present invention. In this particular example, the switching power supply can include power stage circuit 1, primary control circuit 2, and zero-voltage-switching control circuit 3. In this example, power stage circuit 1 has a flyback topology. For example, power stage circuit 1 can include primary winding L1 and main power switch Q1 coupled in series between input voltage Vin and ground, secondary winding L2 coupled to primary winding L1, and synchronous rectifier switch Q2 connected with secondary winding L2. Primary control circuit 2 can generate a switching control signal according to a feedback signal generated by power stage circuit 1 to control the on and off states of main power switch Q1, such that output voltage Vout or the output current can meet the demands.

Further, zero-voltage-switching control circuit 3 can control synchronous rectifier switch Q2 to be turned on for a first time period before main power switch Q1 is turned on in a next cycle, according to a sample signal representing the turn-on moment of main power switch Q1. During the first time period, the negative current can flow through synchronous rectifier switch Q2. After synchronous rectifier switch Q2 is turned off, the drain-source voltage of main power switch Q1 can decreases to approach zero gradually. Thus, zero-voltage-switching for main power switch Q1 can be realized when main power switch Q1 is turned on again, which can greatly reduce the turn-on loss. Any suitable converter topology (e.g., flyback topology buck topology, boost topology, buck-boost topology, etc.). The switching power supply can also include a synchronization rectifying control circuit that may control the operation of synchronous rectifier switch Q2 after main power switch Q1 is turned on, thereby allowing the positive current to flow through synchronous rectifier switch Q2.

In particular embodiments, synchronous rectifier switch Q2 can be turned on a the first time period in advance of a certain time interval or a certain number of resonance cycles before main power switch Q1 is turned on in the next cycle and after the current flowing through the synchronous rectifier switch is decreased to zero, such that zero-voltage-switching of main power switch Q1 can be realized. For example, the turn-on moment of main power switch Q1 in a next cycle can be obtained according to a sample signal representing the turn-on moment of main power switch Q1. Alternatively, the sample signal can be obtained under DCM by detecting switching cycle Tsw of main power switch Q1. Further, the sample signal can also be obtained under the QR mode by detecting the number the resonance cycles in each switching cycle.

Figure 2:
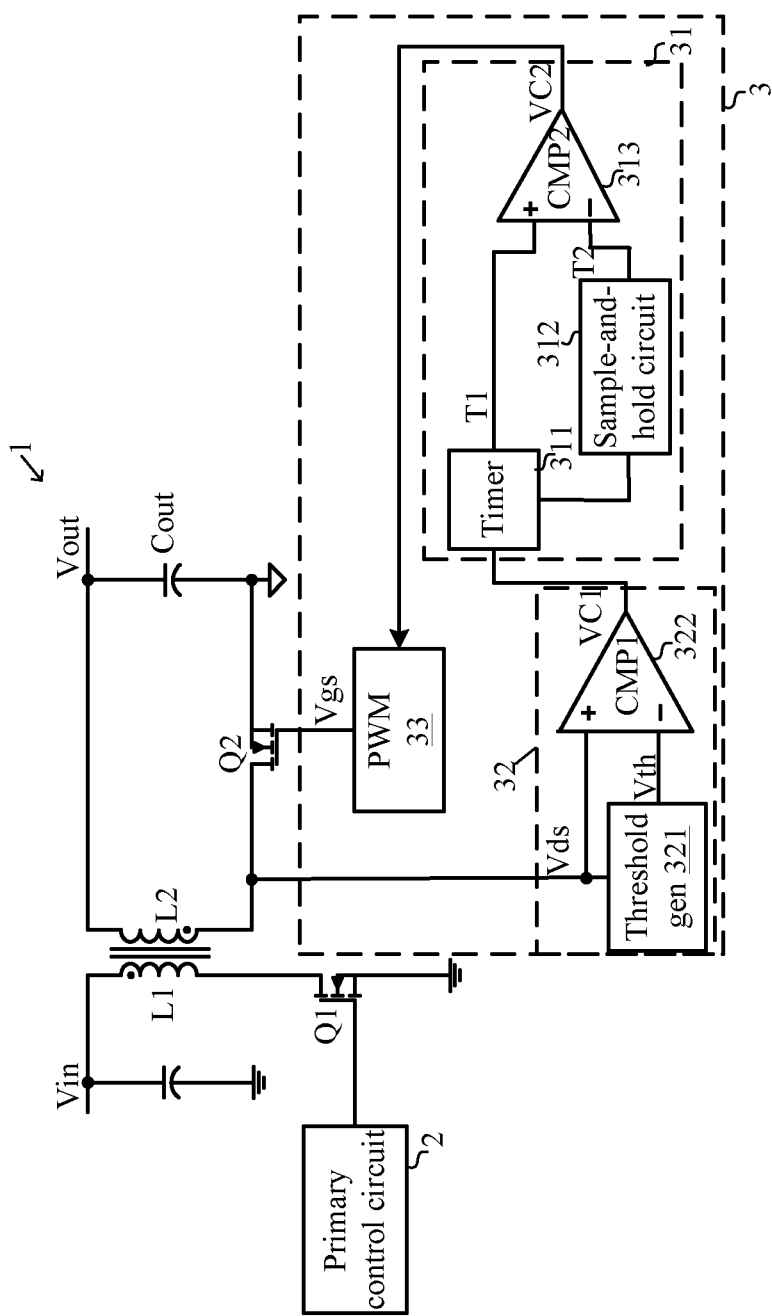
FIG. 2 is a schematic block diagram of a first example zero-voltage-switching control circuit for the switching power supply, in accordance with embodiments of the present invention.

Referring now to FIG. 2, shown is a schematic block diagram of a first example zero-voltage-switching control circuit for the switching power supply, in accordance with embodiments of the present invention. In this example, zero-voltage-switching control circuit 3 can optionally operate under DCM, in order to obtain the sample signal representing the turn-on moment of main power switch Q1 by detecting switching cycle Tsw of main power switch Q1. As is shown zero-voltage-switching control circuit 3 can include cycle timing circuit 31, cycle detecting circuit 32, and PWM circuit 33. For example, cycle timing circuit 31 can time the current switching cycle of main power switch Q1 after main power switch Q1 is turned on, in order to obtain timing value T1 and to turn on synchronous rectifier switch Q2 when timing value T1 reaches reference timing value T2. For example, reference timing value T2 can be less than the timing value of the last switching cycle by time threshold T3. Here, time threshold T3 may characterize the turn-on moment of synchronous rectifier switch Q2 before main power switch Q1 is turned on.

For example, cycle timing circuit 31 can include timer 311, sample-and-hold circuit 312, and comparison circuit 313. Timer 311 can time the current switching cycle of main power switch Q1, thereby obtaining timing value T1. Sample-and-hold circuit 312 can sample and hold the difference between timing value T1 and timing threshold T3, where the difference (T1−T3) is timing reference value T2 in the next cycle. Comparison circuit 313 (e.g., including comparator CMP2) can generate comparison signal VC2 by comparing timing value T1 against timing reference value T2. Comparison signal VC2 can control the on and off states of synchronous rectifier switch Q2.

The non-inverting and inverting input terminals of comparator CMP2 can receive timing value T1 and timing reference value T2, respectively. Further, before timing value T1 reaches timing reference value T2, comparison signal VC2 can remain low, and when timing value T1 reaches timing reference value T2, comparison signal VC2 may go high, thereby turning on synchronous rectifier switch Q2. Thus, synchronous rectifier switch Q2 can be turned on ahead of main power switch Q1 by a period represented by time threshold T3. It should be understood that time threshold T3 may be determined according to circuit parameters, and the drain-source voltage of main power switch Q1 can be decreased to zero within the period characterized by time threshold T3. Cycle detecting circuit 32 can obtain the start time of the current switching cycle; that is, the on time of main power switch Q1 in the current switching cycle, such that cycle timing circuit 31 can accurately time the current switching cycle. Further, cycle detecting circuit 32 can generate a clear signal for clearing timing value T1 when drain-source voltage Vds of synchronous rectifier switch Q2 reaches threshold voltage Vth, and may update timing reference value T2 at the same time.

Figure 3:
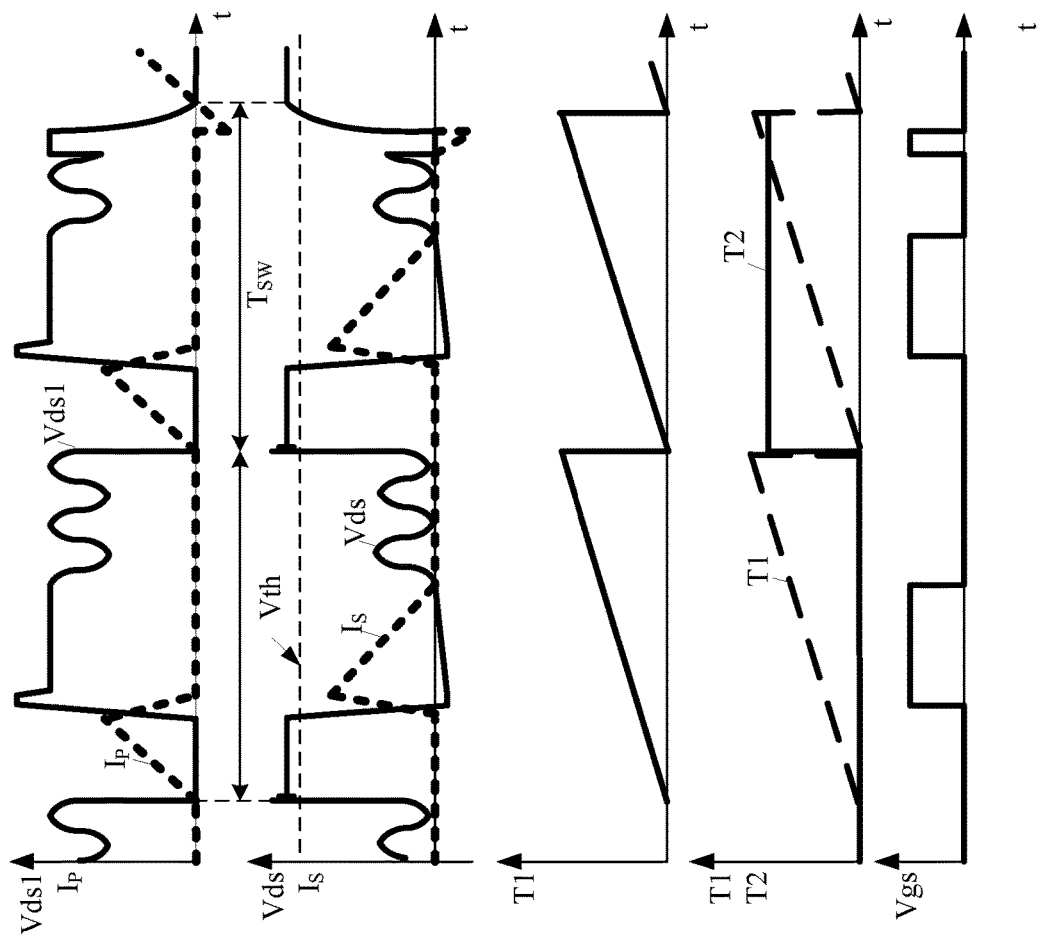
FIG. 3 is a waveform diagram of first example operation of the first example zero-voltage-switching control circuit for the switching power supply, in accordance with embodiments of the present invention.

Referring now to FIG. 3, shown is a waveform diagram of a first example operation of the first example zero-voltage-switching control circuit for the switching power supply, in accordance with embodiments of the present invention. In this particular example, the power stage circuit may have a flyback topology. When main power switch Q1 is turned on, drain-source voltage Vds1 of main power switch Q1 can decrease to be zero and drain-source voltage Vds of synchronous rectifier switch Q2 may increase to be Vin/N+Vout. Here, N is the turn ratio of the transformer. In such a case, when drain-source voltage Vds of synchronous rectifier switch Q2 is detected to increase to threshold voltage Vth, it can be determined as the beginning of the switching cycle. Then, cycle timing circuit 31 may begin to operate (e.g., be enabled). For example, voltage threshold Vth can be K*(Vin/N+Vout) and K may be slightly less than 1.

Cycle detecting circuit 32 can include threshold generation circuit 321 and comparison circuit 322 (e.g., including comparator CMP1). For example, threshold generation circuit 321 can generate threshold voltage Vth according to drain-source voltage Vds of synchronous rectifier switch Q2. The product of drain-source voltage Vds of synchronous rectifier switch Q2 and coefficient K may be taken as threshold voltage Vth. The inverting and non-inverting input terminals of comparator 322 may receive threshold voltage Vth and drain-source voltage Vds of synchronous rectifier switch Q2, respectively. Before drain-source voltage Vds reaches threshold voltage Vth, comparison signal VC1 can be inactive. When drain-source voltage Vds reaches threshold voltage Vth, comparison signal VC1 may be activated. At that moment, timer 311 can clear timing value T1 and start to time again. In addition, sample-and-hold circuit 312 may update timing reference value T2, in order to obtain current timing reference value T2 by timing value T1 of the last cycle (T2=T1−T3).

PWM circuit 33 can generate comparison signal VC2 for controlling synchronous rectifier switch Q2 to be turned on for the first time period (e.g., predetermined time Tth) before main power switch Q1 is turned on and after the current flowing synchronous rectifier switch Q2 is decreased to zero, such that the zero-voltage-switching of main power switch Q1 is realized. As mentioned above, the switching power supply may operate under DCM and main power switch Q1 can be turned on when the switching frequency of main power switch Q1 reaches the predetermined frequency. For example, synchronous rectifier switch Q2 may be turned on for predetermined time Tth before main power switch Q1 is turned on by tracking the switching cycle of main power switch Q1. In this way, zero-voltage-switching can be realized and the loss reduced.

Figure 4:
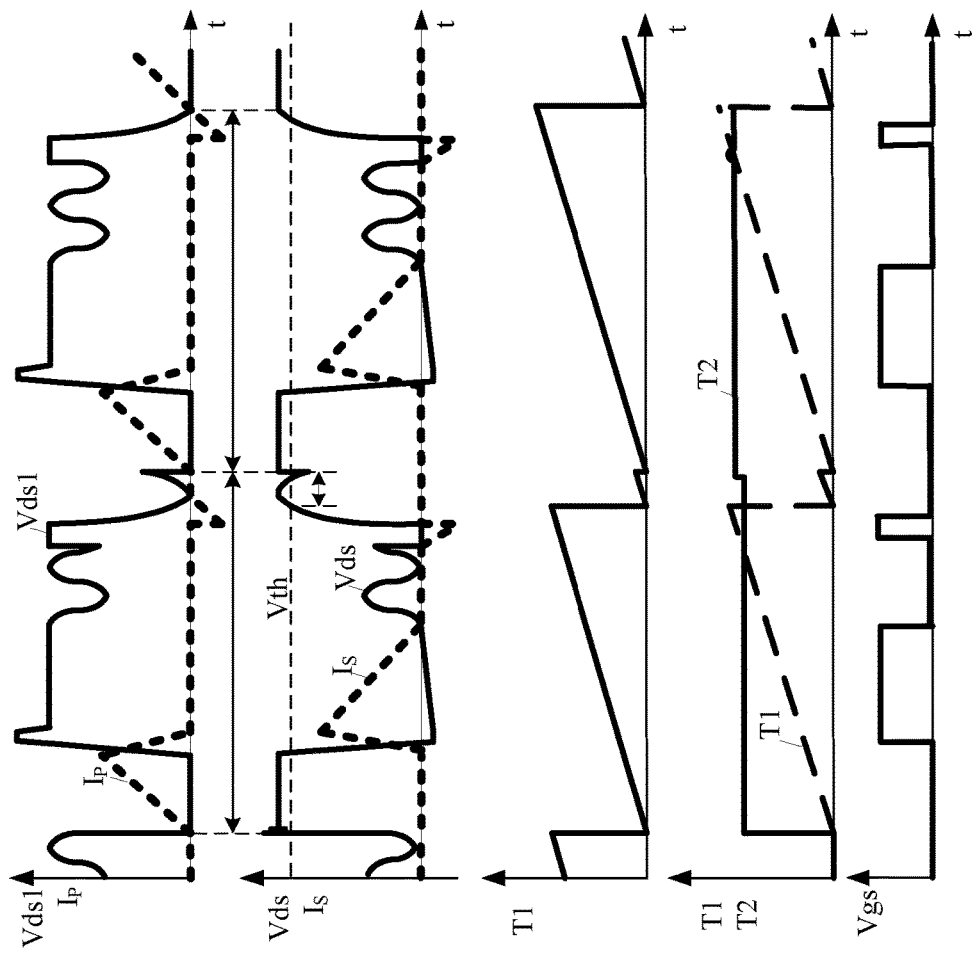
FIG. 4 is a waveform diagram of second example operation of the first example zero-voltage-switching control circuit for the switching power supply, in accordance with embodiments of the present invention.

Referring now to FIG. 4, shown is a waveform diagram of a second example operation of the first example zero-voltage-switching control circuit for the switching power supply, in accordance with embodiments of the present invention. When drain-source voltage Vds1 of main power switch Q1 drops to a low voltage due to the advance conduction of synchronous power switch Q2, main power switch Q1 may not be turned on, but rather can be turned on after drain-source voltage Vds1 rises to a higher voltage. In such a case, drain-source voltage Vds of synchronous rectifier switch Q2 can reach threshold voltage Vth several times in a relatively short time, such that timing value T1 can be cleared, thereby determining that the current switching cycle (recorded as a first switching cycle) increases, and then cycle timing circuit 31 can update the switching cycle, possibly resulting in incorrect operation.

Therefore, sample-and-hold circuit 312 may not update timing reference value T2 when a time period during which drain-source voltage Vds of synchronous rectifier switch Q2 is higher than threshold voltage Vth is less than a time threshold, in order to avoid being turned on mistakenly by the change of the switching cycle. In addition, synchronous rectifier switch Q2 may not be turned on ahead of the turned-on moment of main power switch Q1. Therefore, the increased switching cycle can be obtained by timing cycle circuit 31 in the next cycle (recorded as a second cycle). When the second cycle ends, timing value T1 can be cleared and timing reference value T2 updated. Further, synchronous rectifier switch Q2 can be turned on ahead of predetermined time Tth normally in the next cycle (recorded as a third cycle after the second cycle), thereby realizing zero-voltage-switching.

When the switching cycle decreases, synchronous rectifying power switch Q2 can track the switching cycle of main power switch Q1 according to the operation principle described above. However, main power switch Q1 and synchronous rectifier switch Q2 may be turned on simultaneously. When synchronous rectifier switch Q2 is turned on in the current cycle (recorded as a first cycle) and main power switch Q1 is about to be turned on in the next cycle (recorded as a second cycle), the secondary current can be over the limit value. Therefore, an over-current protection circuit may be utilized in the circuit. Similarly, synchronous rectifier switch Q2 may not be turned on ahead of the turned-on moment of main power switch Q1 in the second cycle. Therefore, the decreased switching cycle can be obtained by timing cycle circuit 31 in the second cycle. When the second cycle ends, timing value T1 can be cleared and timing reference value T2 updated. Further, synchronous rectifier switch Q2 can be turned on ahead of predetermined time Tth normally in the next cycle (recorded as a third cycle after the second cycle), thereby realizing zero-voltage-switching.

Figure 5:
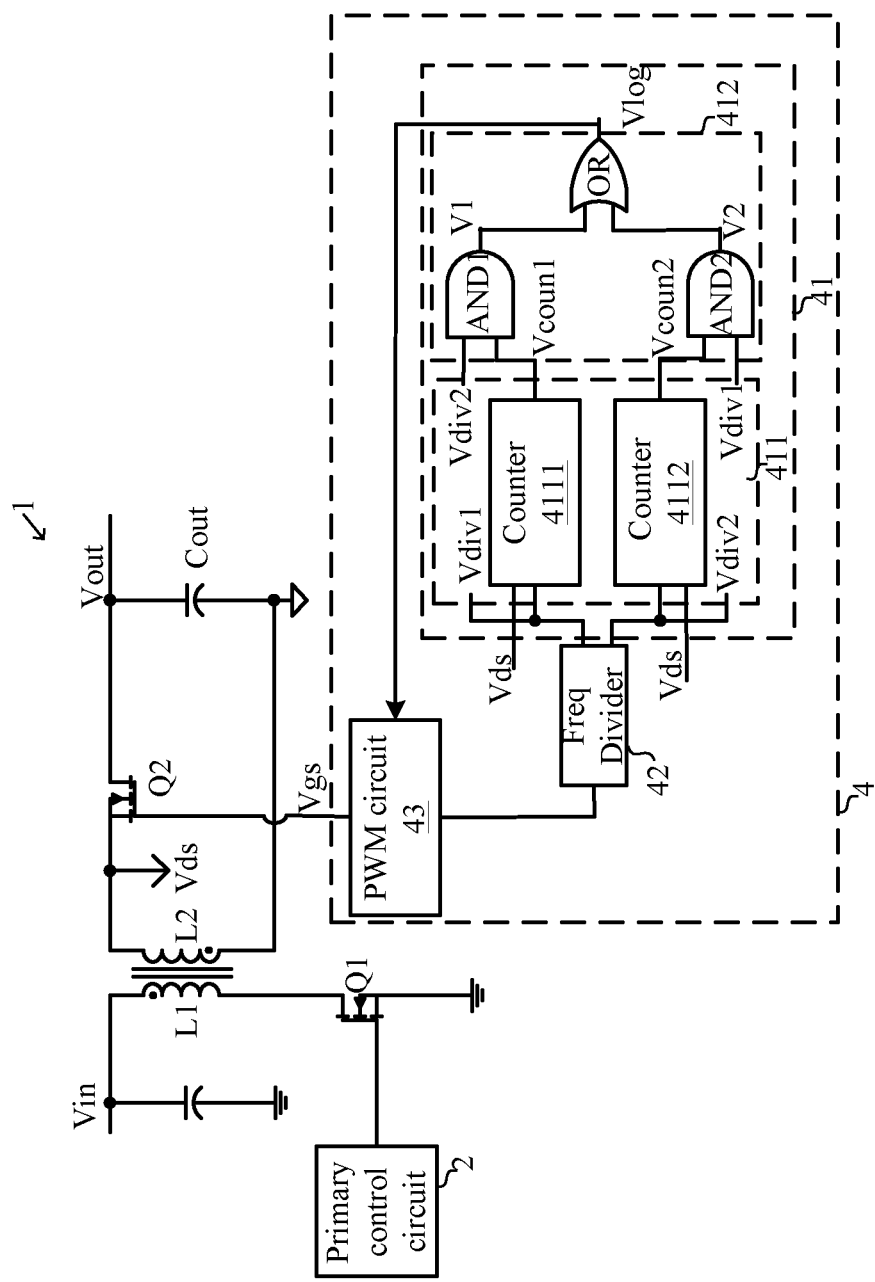
FIG. 5 is a schematic block diagram of a second example zero-voltage-switching control circuit for the switching power supply, in accordance with embodiments of the present invention.

Referring now to FIG. 5, shown is a schematic block diagram of a second example zero-voltage-switch control circuit for the switching power supply, in accordance with embodiments of the present invention. In particular embodiments, zero-voltage-switching control circuit 4 can optionally operate under the QR mode. In this example, the sample signal representing the turn-on moment of main power switch Q1 may be obtained by detecting the number of resonance cycles Vcoun. By tracking the number of resonance cycles Vcoun in each switching cycle, synchronous rectifier switch Q2 can be turned on for predetermined time Tth in advance of the predetermined resonance cycles before main power switch Q1 is turned on and after the current flowing synchronous rectifier switch Q2 is decreased to be zero, such that zero-voltage-switching of main power switch Q1 can be realized. In particular embodiments, synchronous rectifier switch Q2 can be turned on in advance of one resonance cycle before main power switch Q1 is turned on.

For example, zero-voltage-switching control circuit 4 can include resonance counting circuit 41, frequency divider 42, and PWM circuit 43. For example, resonance counting circuit 41 can count the number of the resonance cycles in the current switching cycle to obtain count value Vcoun, and to count down count value Vcoun in the last switching cycle synchronously. When count value Vcoun decreases to be a predetermined value, the synchronous rectifier switch may be turned on. In this example, the predetermined value is 1. For example, resonance counting circuit 41 can include counting circuit 411 and logic circuit 412.

Counting circuit 411 can count the number of the resonance cycles in the current switching cycle to obtain count value Vcoun, and to count down count value Vcoun in the last switching cycle synchronously. Further, counting circuit 411 can include counter 4111 that may count the number of the resonance cycles in the current switching cycle to obtain count value Vcoun1, and count down count value Vcoun1 in the next switching cycle, and to operate alternately and periodically. Counting circuit 411 can also include counter 4112 that may synchronously count down count value Vcoun2 of the last switching cycle in the current switching cycle, and count the number of the resonance cycles in the next switching cycle to obtain count value Vcoun2, and to operate alternately and periodically.

Logic circuit 412 can generate logic signal Vlog when count value Vcoun1 or Vcoun2 is decreased to be the determined value (e.g., 1), in order to turn on synchronous rectifier switch Q2. In this way, zero-voltage-switching for main power switch Q1 may be realized. For example, logic circuit 412 can include AND-gates AND1 and AND2, and OR-gate OR. For example, AND1 can receive count value Vcount1 generated from counter 4111 and frequency division signal Vdiv2, and may generate signal V1. Further, AND2 can receive count value Vcount2 generated from counter 4112 and frequency division signal Vdiv1, and may generate second signal V2. The OR-gate can receive signals V1 and V2, and can output logic signal Vlog.

Frequency divider 42 can generate frequency division signal Vdiv1 and frequency division signal Vdiv2 according to PWM signal (e.g., the control signal for synchronous rectifier switch Q2), in order to control the operation of counting circuit 411. Both the cycles of frequency division signal Vdiv1 and frequency division signal Vdiv2 can be set to be two times that of PWM signal, such that counters 4111 and 4112 may only count up and count down once every two cycles. That is, one of counters 4111 and 4112 can count up, and the other of counters 4111 and 4112 can count down in each switching cycle. For example, frequency division signal Vdiv1 and frequency division signal Vdiv2 may be complementary. PWM circuit 33 can generate PWM signal according to logic signal Vlog, in order to control synchronous rectifier switch Q2 to be turned on for predetermined time Tth before main power switch Q1 is turned on. In this way, zero-voltage-switching for main power switch Q1 can be realized.

Figure 6:
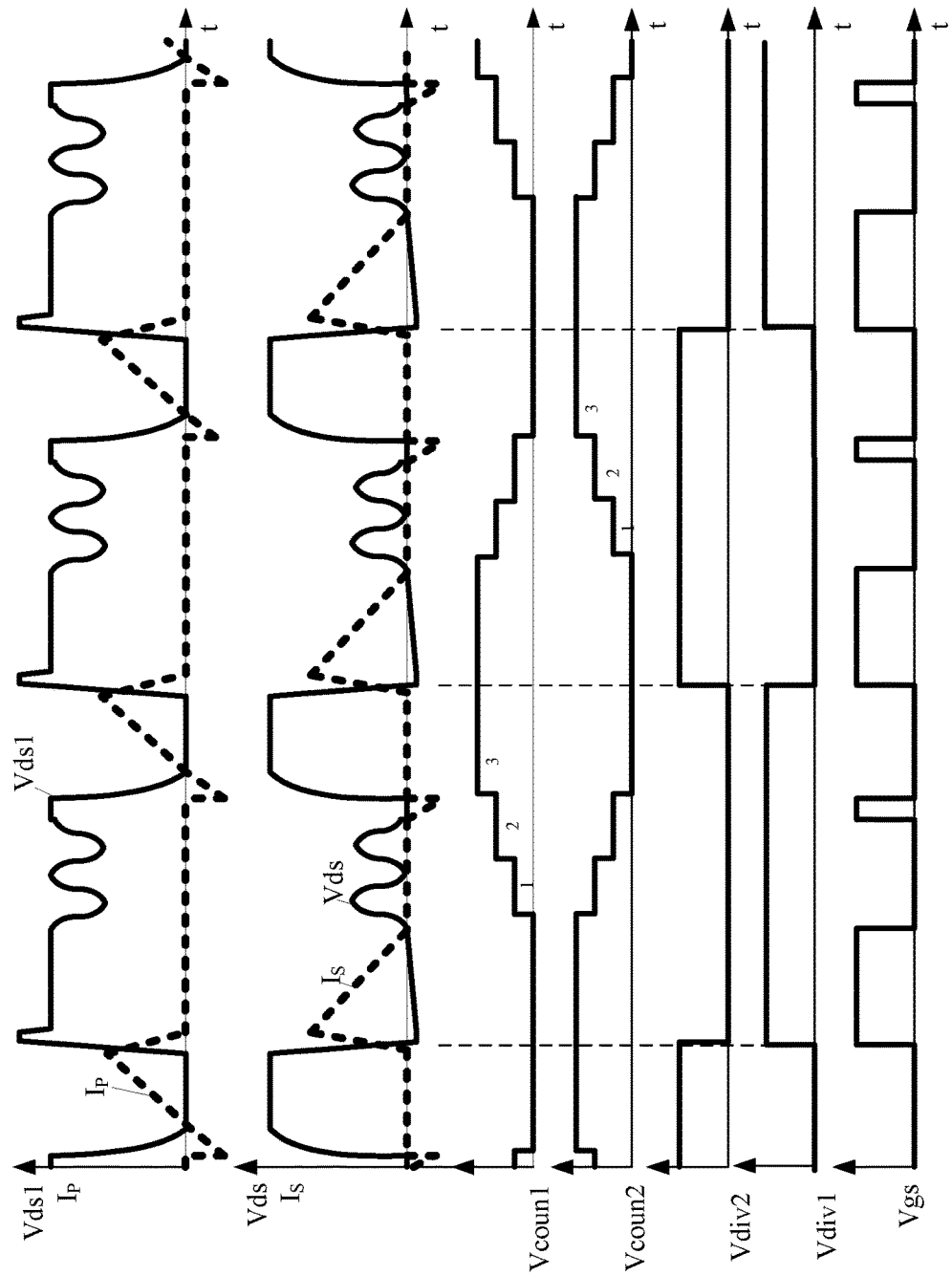
FIG. 6 is a waveform diagram of an example operation of the second example zero-voltage-switching control circuit for the switching power supply, in accordance with embodiments of the present invention.

Referring now to FIG. 6, shown is a waveform diagram of an example operation of the second example zero-voltage-switching control circuit for the switching power supply, in accordance with embodiments of the present invention. For example, counter 4111 can count the number of the resonance cycles in the current switching cycle to obtain count value Vcoun1, and counter 4112 can count down count value Vcoun2 of the last cycle in the current switching cycle. At that time, frequency division signal Vdiv1 can be at a high level, and frequency division signal Vdiv2 may be at a low level. When count value Vcoun2 decreases to be 1, signal V1 can be at a high level and logic signal Vlog may also be at a high level. Then, synchronous rectifier switch Q2 is turned on. Therefore, synchronous rectifier switch Q2 can be turned on for predetermined time Tth in advance of one resonance cycle before main power switch Q1 is turned on, thereby realizing zero-voltage-switching for main power switch Q1.

In addition, it should be understood that the sample signal representing the turn-on moment of main power switch Q1 can also be obtained by detecting the total time of resonance in each switching cycle. In such a case, synchronous rectifier switch Q2 may be turned on for predetermined time Tth in advance before main power switch Q1 is turned on in the next switching cycle, in order to permit the negative current flowing through synchronous rectifier switch Q2, and thereby reducing the drain-source voltage of main power switch Q1, such that main power switch Q1 can be turned on after the drain-source voltage decreases to zero.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A zero-voltage-switching control circuit for a switching power supply having a main power switch and a synchronous rectifier switch, wherein the zero-voltage-switching control circuit is configured to:
   a) control the synchronous rectifier switch to be turned on for a first time period before the main power switch is turned on and after a current flowing through the synchronous rectifier switch is decreased to zero by detecting a switching cycle of the main power switch;
   b) control the synchronous rectifier switch to be turned on for the first time period in a current switching cycle based on a time length of a last switching cycle of the main power switch; and
   c) wherein a drain-source voltage of the main power switch is decreased when the main power switch is turned on, in order to reduce conduction loss.

2. The zero-voltage-switching control circuit of claim 1, wherein the zero-voltage-switching control circuit is configured to time a current switching cycle of the main power switch to obtain a timing value of the current switching cycle, and to control the synchronous rectifier switch to be turned on for the first time period when the timing value of the current switching cycle reaches a difference between a timing value of the last switching cycle and a time threshold.

3. The zero-voltage-switching control circuit of claim 2, wherein the synchronous rectifier switch is controlled to be turned on twice in a switching cycle, and a second conduction time of the synchronous rectifier switch is the first time period.

4. The zero-voltage-switching control circuit of claim 2, further comprising:
   a) a cycle timing circuit configured to time the current switching cycle for the main power switch and to turn on the synchronization rectifying power switch when a corresponding timing value reaches a timing reference value; and
   b) wherein the timing reference value is smaller than the timing value of the last switching cycle by the time threshold.

5. The zero-voltage-switching control circuit of claim 4, wherein the cycle timing circuit comprises:

a) a timer configured to time the current switching cycle of the main power switch, thereby obtaining the timing value of the current switching cycle;
   b) a sample-and-hold circuit configured to sample and hold a difference between the timing value and the timing threshold to be a timing reference value of a next switching cycle; and
   c) a comparison circuit configured to compare the timing value of the current switching cycle against the timing reference value, thereby generating a comparison signal to turn on the synchronous rectifier switch.

6. The zero-voltage-switching control circuit of claim 4, further comprising a cycle detecting circuit configured to obtain a start moment of the current switching cycle to time the current switching cycle.

7. The zero-voltage-switching control circuit of claim 6, wherein the cycle detecting circuit is configured to generate a clear signal for clearing the timing value and update the timing reference value when a drain-source voltage of the synchronous rectifier switch reaches a threshold voltage.

8. The zero-voltage-switching control circuit of claim 7, wherein the cycle detecting circuit comprises a threshold generation circuit that is configured to multiply a drain-source voltage of the synchronous rectifier switch during a conduction time of the main power switch with a proportional coefficient to obtain a threshold voltage, wherein the proportional coefficient is slightly less than 1.

9. The zero-voltage-switching control circuit of claim 7, wherein the timing reference value is not updated when a time period during which the drain-source voltage of the synchronous rectifier switch is higher than the threshold voltage is less than a time interval.

10. The zero-voltage-switching control circuit of claim 7, wherein when the duration of the drain-source voltage of the synchronous rectifier switch higher than the threshold voltage is less than a time threshold, the timing value is superimposed on a previous timing reference value as a new timing reference value.

11. The zero-voltage-switching control circuit of claim 2, further comprising an over-current protection circuit configured to turn off the synchronous rectifier switch when a negative current flowing through the synchronous rectifier switch reaches a limit value, in order to prevent the synchronous rectifier switch from being simultaneously turned on with the main power switch.

12. The zero-voltage-switching control circuit of claim 2, further comprising a synchronous rectifying control circuit configured to control the operation of the synchronous rectifier switch after the main power switch is turned on, thereby allowing a positive current to flow through the synchronous rectifier switch.

13. A zero-voltage-switching control circuit for a switching power supply having a main power switch and a synchronous rectifier switch, wherein the zero-voltage-switching control circuit is configured to:
   a) control the synchronous rectifier switch to be turned on for a first time period before the main power switch is turned on and after a current flowing through the synchronous rectifier switch is decreased to zero by detecting a time length of a resonance in each switching cycle;
   b) control the synchronous rectifier switch to be turned on for the first time period in a current switching cycle based on the time length of the resonance in a last switching cycle; and c) wherein a drain-source voltage of the main power switch is decreased when the main power switch is turned on, in order to reduce conduction loss.

14. The zero-voltage-switching control circuit of claim 13, wherein the zero-voltage-switching control circuit is configured to obtain a timing value of the resonance in the current switching cycle, and wherein when the timing value of the resonance in the current switching cycle reaches a difference between a timing value of the resonance in the last switching cycle and a time threshold, the synchronous rectifier switch is controlled to be turned on for the first time period, in order to allow a negative current to flow through the synchronous rectifier switch.

15. A method of controlling a switching power supply having a main power switch and a synchronous rectifier switch, the method comprising:
   a) controlling the synchronous rectifier switch to be turned on for a first time period before the main power switch is turned on and after a current flowing through the synchronous rectifier switch is decreased to zero by detecting a switching cycle of the main power switch;
   b) timing a current switching cycle of the main power switch to obtain a timing value of the current switching cycle, and controlling the synchronous rectifier switch to be turned on for the first time period when the timing value of the current switching cycle reaches a difference between a timing value of a last switching cycle and a time threshold; and
   c) wherein a drain-source voltage of the main power switch is decreased before the main power switch is turned on to reduce turn-on loss.

16. The method of claim 15, wherein the synchronous rectifier switch is controlled to be turned on twice in a switching cycle, and a second conduction time of the synchronous rectifier switch is the first time period.

17. The method of claim 15, further comprising:
   a) obtaining the timing value by timing from the turn-on moment of the main power switch; and
   b) turning on the synchronous rectifier switch when the timing value of the current switching cycle reaches a timing reference value, wherein the timing reference value is smaller than the timing value of the last switching cycle by the time threshold.

18. The method of claim 17, further comprising:
   a) timing the current switching cycle of the main power switch, thereby obtaining the timing value of the current switching cycle;
   b) sampling and holding a difference between the timing value and the timing threshold to be a timing reference value of a next switching cycle; and
   c) comparing the timing value of the current switching cycle against the timing reference value, thereby generating a comparison signal to turn on the synchronous rectifier switch.

19. The method of claim 17, further comprising obtaining a start moment of the current switching cycle to time the current switching cycle.

20. The method of claim 19, further comprising generating a clear signal for clearing the timing value and update the timing reference value when a drain-source voltage of the synchronous rectifier switch reaches a threshold voltage.

21. The method of claim 20, multiplying a drain-source voltage of the synchronous rectifier switch during a conduction time of the main power switch with a proportional coefficient to obtain a threshold voltage, wherein the proportional coefficient is slightly less than 1.

22. A method of controlling a switching power supply having a main power switch and a synchronous rectifier switch, the method comprising:
   a) detecting a time length of a resonance in each switching cycle; and
   b) obtaining a timing value of the resonance in a current switching cycle, wherein when the timing value of the resonance in the current switching cycle reaches a difference between a timing value of the resonance in a last switching cycle and a time threshold, the synchronous rectifier switch is controlled to be turned on for a first time period, in order to allow a negative current to flow through the synchronous rectifier switch.

* * * * *